United States Patent

Schmidt et al.

[15] 3,701,300
[45] Oct. 31, 1972

[54] MATERIAL CUTTING APPARATUS HAVING A SELECTOR

[72] Inventors: Volker Schmidt, Todds Road, R. R. No. 7, Lexington, Ky. 40502; Erich A. Schmidt, 2415 Liberty Road, Lexington, Ky. 40505

[22] Filed: March 9, 1971

[21] Appl. No.: 122,415

[52] U.S. Cl. ........................83/80, 83/209, 83/106, 83/522
[51] Int. Cl. ..............................B26d 7/06
[58] Field of Search..........83/80, 102, 106, 107, 209, 83/360, 372, 522

[56] References Cited

UNITED STATES PATENTS

2,950,640   8/1960   Camp.............................83/80
2,989,883   6/1961   Zimsky et al................83/372
3,461,759   8/1969   Dixon et al....................83/80

Primary Examiner—Donald R. Schran
Attorney—Frank C. Leach, Jr.

[57] ABSTRACT

A vertically fed strip of material is cut into segments of selected lengths by a horizontally movable cutting blade. The thickness of the strip of material is measured so that the cut segment has its thickness measured during the feed portion of the previous cycle to that in which it is cut. If the thickness of the strip of material exceeds a predetermined thickness, the measured segment is diverted into another area after being cut during the next cycle.

11 Claims, 12 Drawing Figures

MATERIAL CUTTING APPARATUS HAVING A SELECTOR

In manufacturing pants, a plurality of lays or pieces of material is stacked for cutting. The pattern for each lay or piece of material includes a strip, which is cut therefrom, with the strip to be later cut into smaller segments for use as belt loops for the pants.

After being cut from lays or pieces of material, the strips of the lays or pieces of material are then sewed to each other and supplied to a strip cutting machine wherein the strip is cut into segments of the desired length with the segments forming the belt loops. After the strip has been cut into segments of the selected length by the operator of the strip cutting machine, the cut strips or segments are transferred to a loop tack operator, who sews the cut strips on the pants at spaced intervals to form the belt loops.

One way of sewing strips of the lays or pieces of material to each other is to overlap the adjacent ends of two strips and sew these to each other. This produces a thickened portion of strip of material, produced by sewing the strips of the lays together, in comparison with the remainder of the strip.

The thickened portion of the strip of material cannot be employed as a belt loop so that it must be discarded. Therefore, it is necessary that the cut segments of the strip of material having a thickened portion be separated from the cut segments that do not have a thickened portion.

Another way of sewing the strips of the lays or pieces of material to each other is to space the adajcent ends of two strips slightly from each other and employ threads therebetween to sew these spaced adjacent ends to each other. This produces a thin portion of the strip of material, produced by sewing the strips of the lays together through spacing the adjacent ends and utilizing threads, in comparison with the remainder of the strip.

The thin portion of the strip of material cannot be employed as a belt loop so that it must be discarded. Therefore, it is necessary that the cut segments of the strip of material having a thin portion be separated from the cut segments that do not have a thin portion.

While the cut segments could be visually inspected by the operator of the strip cutting machine, this requires a period of time. If the operator is working on a piece rate basis, the rate must be adjusted to compensate for this time. If the operator is working on an hourly basis, this also increases the time necessary for the operator to produce the cut segments. Accordingly, the cost for producing a pair of pants is increased when this inspection must be visually made.

It has previously been suggested to use a cutting apparatus for cutting the strip of material into segments of a selected length in which there is measurement of the thickness of the strip of material several cycles of operation prior to the cutting of the strip of material when the strip of material is formed by overlapping the adjacent ends of strips from the lays or pieces of material and sewing them to each other to form the thickened portion. However, this creates a cumulative error because of the stretching of the strip of material at various times during its feed whereby the cut segment, which has the thickened portion, can be diverted to the wrong area. This is particularly true where the thickened portion occurs at the end of one of the cut segments.

The present invention satisfactorily overcomes the foregoing problem by measuring the thickness of the strip of material only one cycle of operation prior to when the particular segment is cut from the strip of material. Thus, because the measurement occurs in the preceding cycle, the possibility of any cumulative error occurring due to stretching of the strip of material is eliminated.

Furthermore, the present invention is able to measure the strip of material irrespective of whether it is formed by sewing the overlapped ends of strips from the lays or pieces of material or connecting the spaced adjacent ends of the strips from the lays or pieces of material by threads. Accordingly, the present invention insures that the cut segment having a thickness, whether thinner or thicker than the desired range of thickness, is the one that is diverted to a different area than that for cut segments having a thickness in the desired range.

In the previously suggested apparatus, the strip of material has been fed in a horizontal direction and cut by a vertically movable knife. This machine has required a large support area to enable this type of feed to occur whereas the present invention requires only a limited support area because of utilizing a vertical feed with a horizontally movable cutting blade to substantially reduce the area required to support the apparatus of the present invention.

Furthermore, in the previously suggested spparatus in which the horizontal feed was employed, there was no way to prevent hang up of a remaining portion of the strip of material at the completion of cutting. By utilizing the vertical feed in the apparatus of the present invention, there is no hang up of the material at the end of cutting because the remaining portion of the strip of material can fall by gravity.

Because of the cutting of materials of different thicknesses at different times, it is necessary to be able to adjust the mechanism that measures the thickness of the strip of material. For a thicker material when the strip is formed by sewing overlapped ends, the measuring mechanism must enable the strip of material to pass through the measuring mechanism without the mechanism indicating that this is a thickened portion in comparison with a thinner strip of material for which the apparatus may have previously been set. The previously suggested mechanism utilized a complicated mechanism for adjusting the sensitivity of the measuring mechanism.

The present invention overcomes the foregoing problem by employing a simplified means for adjusting the sensitivity of the measuring mechanism. Thus, the present invention enables the operator to quickly and easily adjust the sensitivity of the thickness measuring mechanism.

Additionally, the present invention enables the measuring mechanism to be adjusted for a thinner material when the continuous strip is formed by sewing adjacent spaced ends to each other by threads. This adjustment is in a similar manner as to when the continuous strip is formed by sewing overlapped ends. Thus, the measuring mechanism enables the continuous strip of material to pass through the measuring mechanism without the mechanism indicating that this is a thin portion in comparison with a thicker strip of material for which the apparatus may have previously been set. This was not employed in the previously suggested apparatus.

In the previously suggested apparatus, the horizontal feeding of the strip of material resulted in the operator not being able to see the entire strip. The present invention overcomes this by utilizing an apparatus in which the entire length of the strip of material is visible to the operator.

In the present invention, the control of the feeding of the strip of material, the measuring of the thickness of the material, the activation of the cutting means, and the activation of the selector to divert the cut segment having the portion not within the desired thickness range at the proper time are correlated to each other through a single drive means. This enables the apparatus of the present invention to cut the strip of material at a faster speed because of the correlation of the various portions of the cycle with respect to each other through the single driving means.

An object of this invention is to provide a cutting apparatus in which segments are automatically separated after being cut into two different areas in accordance with the thickness of the cut segments.

Another object of this invention is to provide a cutting apparatus in which adjustments may be easily made to determine the predetermined thickness at which a cut segment is diverted to a different area from a cut segment within the predetermined thickness range.

Other objects of this invention will be readily perceived from the following description, claims, and drawings.

This invention relates to an apparatus for cutting a strip of material in segments of a selected length including means to feed the strip of material in a vertical direction past a cutting position and means to cut the fed material at the cutting position with the cutting means disposed beneath the feed means. The apparatus has means controlling the feed means and the cutting means to stop feed of the strip of material by the feed means before the cutting means cuts the strip of material. There also is means to measure the thickness of the strip of material with the measuring means being disposed above the feed means to measure the thickness of the strip of material during the feed portion of the cycle preceding the cutting of the measured portion of the strip of material by the cutting means. Selector means is disposed beneath the cutting means to direct the cut segment into a first area when its thickness is not within a predetermined thickness range and a second area when its thickness is within the predetermined thickness range. The apparatus has means responsive to the measuring means determining that the strip of material is not within the predetermined thickness range to cause the selector means to direct the cut segment during the cutting portion of the next cycle to the first area.

The attached drawings illustrate a preferred embodiment of the invention, in which.

Referring to the drawings and particularly FIGS. 1A to 4, there is shown the cutting apparatus of the present invention including a frame 10 supported on a stand 11. The frame 10 has a base 12, which is supported by the stand 11, and a pair of upstanding supports 14 and 15 (see FIG. 3), which are spaced from each other and substantially parallel to each other. The support 14 has an inside cover 13 secured to its back surface. The upper ends of the supports 14 and 15 have a U-shaped member 15' (see FIG. 1B) connected thereto.

A shaft 16 is rotatably supported by the supports 14 and 15, which extend upwardly from the base 12, and extends beyond each side thereof. A knurled roller 17, which is preferably formed of metal, is fixed to the shaft 16 for rotation therewith. Thus, whenever the shaft 16 is rotated, the knurled roller 17 is rotated.

Figure 10:
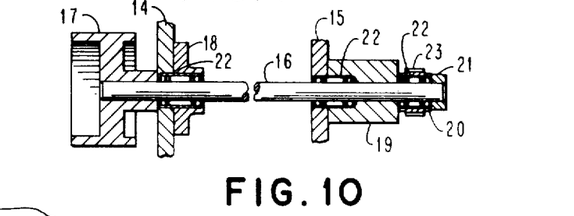
FIG. 10 is a sectional view showing the support arrangement for the driven roller of the feed mechanism of the apparatus of the present invention and taken along line 10—10 of FIG. 3.

The shaft 16 is rotatably supported in the support 14 by a bearing housing 18 (see FIG. 10) through which the shaft 16 extends. The shaft 16 is rotatably supported in the support 15 by a bearing housing 19 through which the shaft 16 extends.

A gear housing 20 is mounted on the shaft 16 adjacent to the bearing housing 19 and has the shaft 16 extending therethrough. The gear housing 20 is held in position adjacent the bearing housing 19 by a collar 21, which is fixed to the end of the shaft 16.

Figure 2:
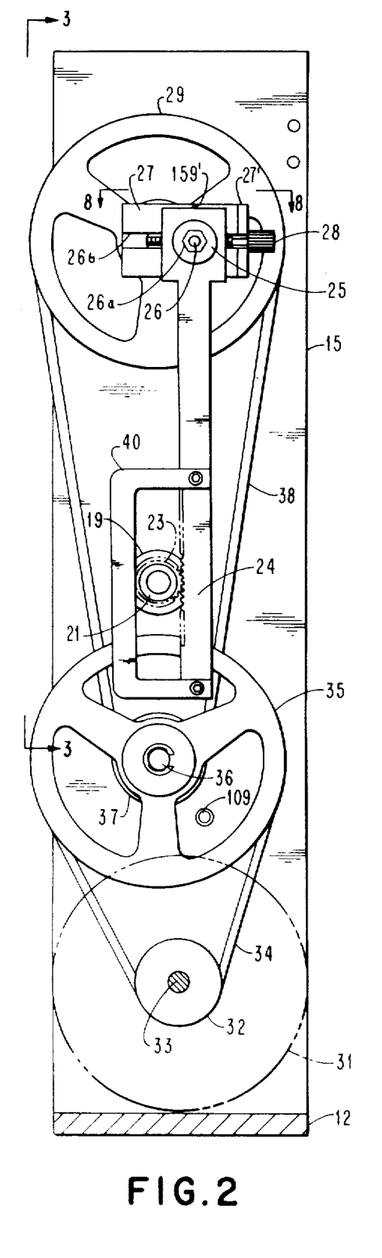
FIG. 2 is a rear elevational view of the portion of the apparatus of the present invention shown in FIG. 1A.
Figure 3:
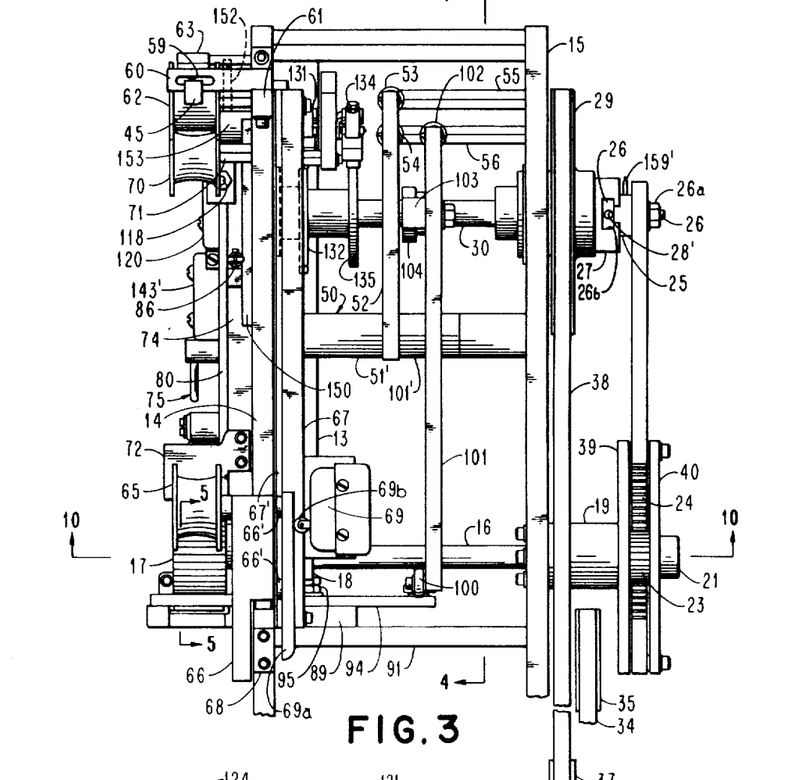
FIG. 3 is a side elevational view of a portion of the apparatus of FIG. 2 and taken along line 3—3 of FIG. 2.

Each of the bearing housings 18 and 19, which are secured to the supports 14 and 15, respectively, and the gear housing 20 has a one direction clutch 22 disposed therein whereby the shaft 16 can be rotated only in one direction even though a gear 23 on the gear housing 20 is driven in opposite directions by a cooperating rack 24 (see FIGS. 2 and 3). One suitable example of the one direction clutches 22, which rotatably mount the shaft 16, is sold by Torrington Manufacturing Company, Torrington, Connecticut as Model RCB–081214.

Figure 8:
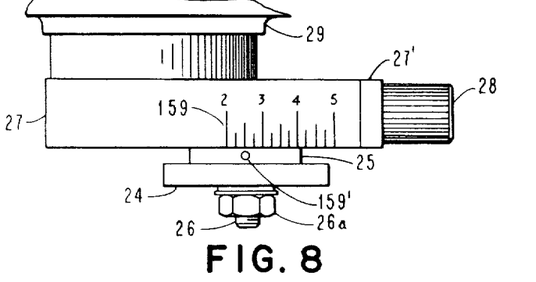
FIG. 8 is a top plan view of a mechanism to adjust the amount of feed of the strip of material during each cycle of operation.

The upper end of the rack 24 is secured to a bearing 25 (see FIGS. 2 and 8) by a step screw 26 and a lock nut 26a. The step screw 26 has its head (see FIG. 3) sliding in a groove 26b in a block 27 (see FIGS. 2 and 8), which has a screw bearing block 27' connected to one end thereof. An adjusting screw 28 extends through the screw bearing block 27' and is threadedly connected to a tapped hole 28' (see FIG. 3) in the head of the step screw 26.

Figure 4:
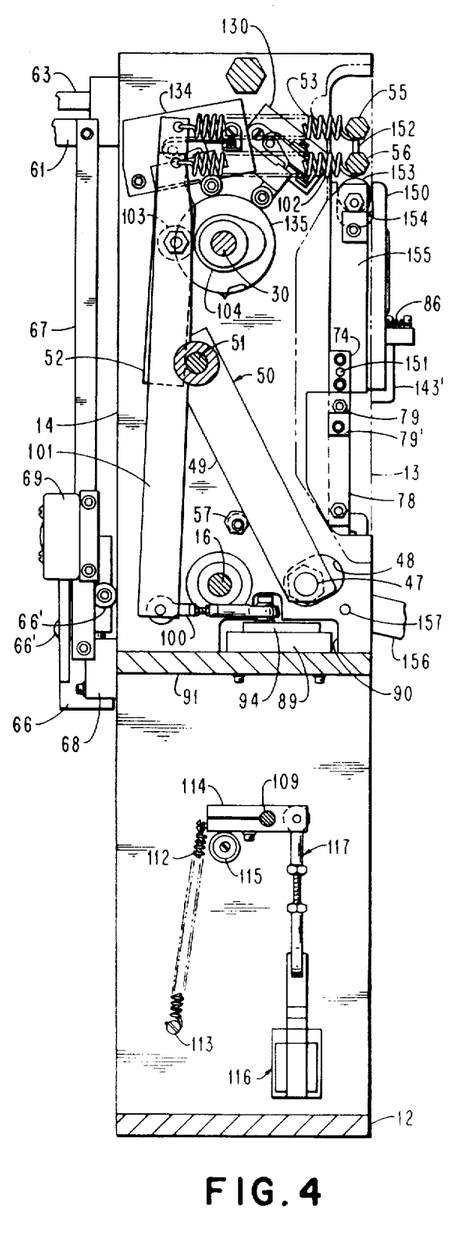
FIG. 4 is an elevational view, partly in section, looking toward the front of the apparatus of the present invention and taken substantially along line 4—4 of FIG. 3.

The block 27 is fixed to a pulley 29 (see FIG. 2), which is supported on one end of a shaft 30 (see FIGS. 3 and 4). The shaft 30 is rotatably mounted in the supports 14 and 15.

Accordingly, when the pulley 29 is rotated, the rack 24 is moved in an upward or downward direction with the amount of movement of the rack 24 in each direction being determined by the position of the step screw 26 relative to the rotational axis of the pulley 29. Thus, by moving the step screw 26, which has its head slidable in the groove 26b in the block 27, in the block 27 further from the axis of rotation of the pulley 29, the movement of the rack 24 for each revolution of the pulley 29 in each direction is increased. Similarly, moving the step screw 26 closer to the axis of rotation of the pulley 29 decreases the movement of the rack 24 for each revolution of the pulley 29.

The pulley 29 is driven from a motor 31 (see FIG. 2), which is supported on a portion of the base 12 of the frame 10 extending beyond the support 15 and remote from the support 14. The motor 31 has a pulley 32 on its shaft 33 connected by a belt 34 to a pulley 35, which is rotatably mounted on a stud 36 fixed to the support 14 of the frame 10. The pulley 35 has a pulley 37 rotatable therewith by being secured thereto by screws, for example. A belt 38 connects the pulley 37 to the pulley 29 whereby the pulley 29 rotates due to the motor 31 being activated.

To maintain the rack 24 in engagement with the gear 23 on the gear housing 20, a pair of U-shaped bars 39 (see FIG. 3) and 40 (see FIGS. 2 and 3) is secured to the opposite sides of the rack 24. Each of the bars 39 and 40 has one end secured to the rack 24 adjacent the lower end of the rack 24 and the other end secured to the rack 24 intermediate its end. The inner bar 39 passes between the gear 23 and the end of the bearing housing 19 while the outer bar 40 bears against the other side of the gear 23. Accordingly, the rack 24 is maintained centered with respect to the gear 23.

Because of the one direction clutches 22, the shaft 16 is rotated only when the rack 24 is moved downwardly by the rotation of the pulley 29. Accordingly, the shaft 16 is rotated only during 180° of each revolution of the pulley 29.

The rotation of the shaft 16 results in a strip 45 (see FIG. 1A) of material being advanced due to the knurled roller 17 cooperating with a roller 46. The knurled roller 17 is rotated the same amount as the shaft 16.

Accordingly, the amount of rotation of the knurled roller 17 during each revolution of the pulley 29 is determined by the downward movement of the rack 24. Therefore, by adjusting the position of the step screw 26 in the block 27 through the adjusting screw 28 moving the head of the step screw 26 in the groove 26b, the amount of feed of the strip 45 of material during each revolution of the pulley 29 can be selected to give a desired length of the strip 45 of material that is to be cut.

The roller 46 (see FIGS. 1A and 5), which is preferably formed of plastic such as nylon, for example, is rotatably mounted on a stud 47, which extends through an enlarged opening 48 (see FIG. 4) in the support 14 of the frame 10 and has its other end fixed to the lower end of an arm 49 of a lever 50. The lever 50 is pivotally mounted on a rod 51, which extends between the supports 14 and 15, by a hub 51' (see FIG. 3) surrounding the rod 51. The lever 50 has an upwardly extending arm 52, which has a pair of springs 53 and 54 secured to its free end, extending from the hub 51' in addition to the downwardly extending arm 49. The spring 53 also is secured to a stud 55, which is fixed to the support 15, and the spring 54 has its other end secured to a stud 56, which also is fixed to the support 15.

The springs 53 and 54 continuously urge the arm 49 of the lever 50 against a stop 57 (see FIG. 4) on the support 14. In this position of the lever 50, there is a very minute space between the roller 46 and the knurled roller 17 to prevent any engagement between the rollers 17 and 46 if there is no material therebetween. This prevents any damage to the roller 46 by the knurled roller 17.

However, because of the springs 53 and 54 continuously urging the arm 49 of the lever 50 against the stop 57, the roller 46 is positioned so that it can cooperate with the knurled roller 17 whereby the roller 17 can feed the strip 45 of material therebetween. The strip 45 of material is fed through an opening 59 (see FIG. 3) in a lead-in guide 60 (see FIGS. 1A and 3), which is supported on the end of an arm 61 fixed to the support 14.

The strip 45 of material is fed over a guide roller 62 (see FIG. 1A), which is rotatably mounted on the arm 61. A drag arm 63, which is pivotally mounted on a pin 64 extending from the arm 61, bears against the strip 45 of material to maintain a drag on the strip 45 of material.

The strip 45 of material passes downwardly from the roller 62 around a roller 65, which is rotatably mounted on a block 66. The block 66 is mounted for sliding movement on a vertically disposed bar 67, which has its upper end fixed to the arm 61 and its lower end secured to a block 68 (see FIG. 4) fixed to the support 14, through having rollers 66' slide in longitudinal grooves 67' (one shown in FIG. 3) in opposite sides of the bar 67.

The roller 65 and the block 66 move upwardly only when the strip 45 of material is prevented from being fed from a sewing machine (not shown) at which the various segments forming the strip 45 of material are sewed to each other. Whenever the roller 65 and the block 66 move upwardly a predetermined distance because of the strip 45 of material being prevented from being fed from the sewing machine, a switch 69 (see FIGS. 3 and 4), which is mounted on the bar 67, is opened because a portion 69a of the block 66 ceases to engage a roller 69b on a resiliently biased arm of the switch 69. When the switch 69 is opened, the motor 31 is turned off whereby feeding of the strip 45 of material between the rollers 17 and 46 is stopped due to the rack 24 being prevented from moving because of the inactivation of the motor 31.

The strip 45 of material passes upwardly from the roller 65 over a guide roller 70 (see FIG. 1A), which is rotatably mounted on a stud 71 fixed to the support 14 and extending therefrom. From the roller 70, the strip 45 of material passes downwardly between a meter plate 72 and a meter finger 73 before passing between the rollers 17 and 46.

The meter plate 72 is secured to a meter base block 74, which is slidably mounted on the support 14. The meter base block 74 is retained in any position to which it is moved by a clamp lever 75.

Figure 7:
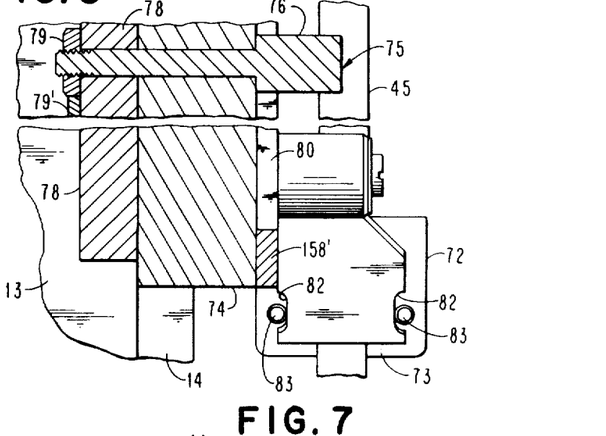
FIG. 7 is a sectional view, partly in elevation, showing a portion of the mechanism for measuring the thickness of the strip of material and a portion of the mechanism for slidably adjusting the vertical position of the measuring mechanism and taken along line 7—7 of FIG. 1A.

The clamp lever 75 includes a screw 76 having a handle 77 connected thereto. The screw 76 extends through an opening (see FIG. 7) in the meter base block 74 and an opening in a block 78. The block 78 bears against one side of the support 14 and the meter base block 74, which is L-shaped in cross section, bears against the other side and the end of the support 14. A nut 79 cooperates with the threaded portion of the screw 76 so that the meter base block 74 and the block 78 may be moved toward or away from each other whereby the meter base block 74 may be held in the position to which it is moved through turning the handle 77. The nut 79 is prevented from turning when the handle 77 is turned by a plate 79' fixed to the back of the block 78.

The meter finger 73 is fixed to a meter arm 80 (see FIG. 1A), which is pivotally mounted on a pivot pin 81 fixed to the meter base block 74. The opposite edges of the meter finger 73 have grooves 82 (see FIG. 7) therein to receive extending pins 83 on the meter plate 72.

The meter finger 73 has a central longitudinal portion of its surface in the shape of a concave curve to aid in centering the strip 45 of material as the strip 45 of material is fed between the meter plate 72 and the meter finger 73. The pins 83 on the meter plate 72 aid in insuring that the strip 45 of material does not become displaced if it should cease to ride in the longitudinal curved portion of the surface of the meter finger 73.

Since the meter arm 80 and the meter plate 72 are both carried by the meter base block 74, any upward or downward sliding movement of the meter base block 74 moves both the meter plate 72 and the meter finger 73 vertically relative to the rollers 17 and 46. The position of the meter plate 72 and the meter finger 73 relative to the rollers 17 and 46 is determined in accordance with the length of the strip 45 of material that is to be cut during each cycle. A top surface or edge 84 (see FIG. 1A) of the meter plate 72 cooperates with indicia on a scale 85, which is fixed to the support 14, to indicate the length of the strip 45 of material that is to be cut.

A spring 86, which has one end secured to the meter arm 80 and the other end connected to the meter base block 74, continuously urges the meter arm 80 counterclockwise (as viewed in FIG. 1A) about the axis of the pivot pin 81. Thus, when the strip 45 of material is not fed between the meter plate 72 and the meter finger 73, the meter finger 73 is urged into engagement with the meter plate 72 by the spring 86.

Accordingly, when the strip 45 of material passes between the meter plate 72 and the meter finger 73, the meter arm 80 pivots clockwise about the axis of the pin 81 to accommodate the strip 45 of material. As the thickness of the strip 45 of material increases, a greater clockwise pivoting of the meter arm 80 occurs.

After the strip 45 of material passes between the meter plate 72 and the meter finger 73 and between the rollers 17 and 46, the strip 45 of material passes through an opening 87 (see FIG. 5) in a guide 88, which is supported on a plate 89. The plate 89 extends through an opening 90 (see FIG. 4) in the support 14 and is fixed to a plate 91 (see FIGS. 3 and 4), which extends between the supports 14 and 15 and is connected thereto.

The plate 89 supports a knife or cutting blade 92 (see FIGS. 1A and 5) on its upper surface. The knife or cutting blade 92 cooperates with a movable knife or cutting blade 93 to cut the strip 45 of material when the movable knife or cutting blade 93 is moved horizontally relative to the stationary knife or cutting blade 92.

The movable knife or cutting blade 93 is fixed to an arm 94 (see FIGS. 3 to 5), which extends through the opening 90 in the support 14 and is pivotally mounted on the plate 89 by a pivot pin 95 (see FIG. 3). Accordingly, when the arm 94 is pivoted about the pivot pin 95, cutting of the strip 45 of material occurs.

Figure 5:
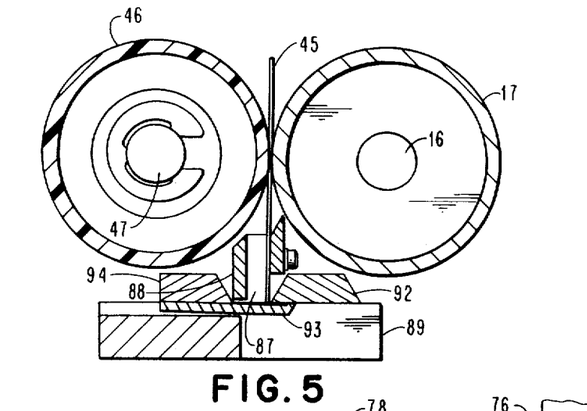
FIG. 5 is a sectional view, partly in elevation, showing the relationship between the feed rollers and the guide means of the present invention and taken along line 5—5 of FIG. 3.
Figure 6:
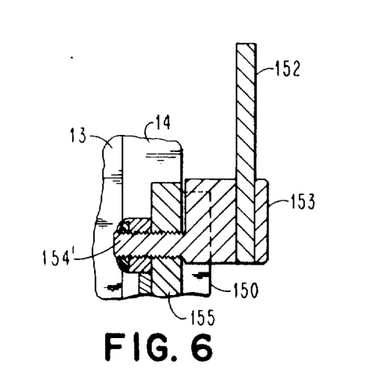
FIG. 6 is a sectional view, partly in elevation, showing the adjusting mechanism for changing the sensitivity of the thickness measuring means of the present invention and taken along line 6—6 of FIG. 1A.

As shown in FIG. 5, the knife or cutting blade 93 has its end, which cooperates with the stationary cutting blade 92 to cut the strip 45 of material, extending or projecting slightly (about 0.005inch) above the remainder of the upper surface of the cutting blade 93. The guide 88 has the central portion of its bottom surface undercut slightly (about 0.005inch). These are exaggerated in FIG. 5.

Accordingly, the projecting end of the cutting blade 93 has only one side engaged by the guide 88 at one side of the guide 88. When the cutting blade 93 is pivoted with the arm 94 about the pivot pin 95 to move the cutting blade 93 toward the stationary cutting blade 92, a scissor action occurs as the projecting end of the cutting blade 93 moves along the bottom of the stationary cutting blade 92.

The arm 94 is connected through a link 100 (see FIGS. 3 and 4) to the lower end of an arm 101, which is pivotally mounted on the rod 51 by a hub 101' (see FIG. 3) surrounding the rod 51. The link 100 enables the arm 94 to pivot about the pivot pin 95 in response to pivoting of the arm 101 about the axis of the rod 51.

The arm 101 is continuously biased to a position in which the cutting blade or knife 93 will not be in its cutting position by a spring 102 (see FIGS. 3 and 4), which is connected to the upper end of the arm 101 and to the stud 56. The arm 101 has a roller 103 mounted between the upper end of the arm 101 and the hub 101' of the arm 101. The roller 103 functions as a cam follower by riding on the surface of a cam 104, which is secured to the shaft 30.

Accordingly, during each revolution of the pulley 29, the cam 104 cooperates with the roller 103 to move the arm 101 against the force of the spring 102 so that the arm 94 is pivoted about the pin 95 to move the cutting blade 93 into cooperation with the stationary cutting blade 92, as shown in FIG. 5, to cut the strip 45 of material. The profile of the cam 104 is designed so that the spring 102 becomes effective as soon as cutting of the strip 45 of material is completed to retract the cutting blade 93 from cooperation with the cutting blade 92 to its inactive position.

Accordingly, the cutting of the strip 45 of material is coordinated with feeding of the strip 45 of material by driving of the roller 17. The cutting of the strip 45 of material does not occur until after feeding of the strip 45 of material has been completed. Since feeding of the strip 45 of material ceases when downward movement of the rack 24 stops, the cutting of the strip 45 of material occurs during upward movement of the rack 24.

After the strip 45 of material has been cut to the desired length, the cut segment or strip falls downwardly by gravity into a selector chute 105 (see FIG. 1A), which has a pair of diverging passages 106 and 107. When a selector 108, which is fixed to a pin 109 for pivoting therewith, is in the position of FIG. 1A, the cut segment of the strip 45 of material enters the passage 106 of the selector chute 105. The selector 108 is in the position of FIG. 1A when the thickness of the cut strip or segment of the strip 45 of material does not exceed a predetermined thickness.

If the thickness of the cut segment of the strip 45 of material exceeds the predetermined thickness, then the selector 108 is disposed in a position in which the cut segment enters the passage 107 of the selector chute 105. This indicates that the cut segment is not satisfactory for use as a belt loop. The cut segments fall from the passage 106 into a container 110 while the cut segments fall from the passage 107 into a container 111.

Figures 1A, 1B:
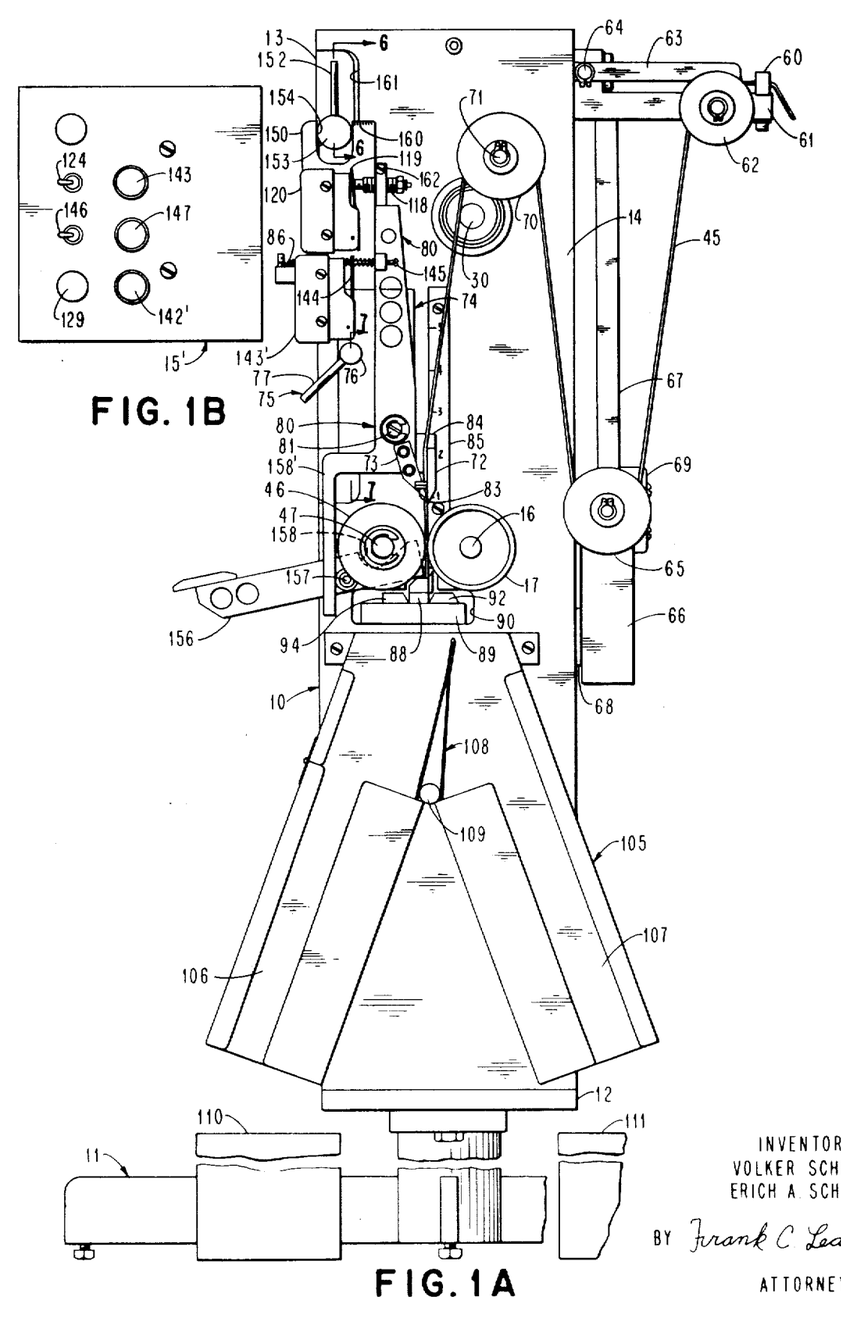
FIGS. 1A and 1B are a front elevational view of the apparatus of the present invention with the portion of the apparatus of FIG. 1B being disposed on top of the portion of the apparatus of FIG. 1A.

The selector 108 is retained in the position of FIG. 1A by a spring 112 (see FIG. 4), which has one end secured to a stud 113 on the support 14 and its other end connected to a block 114, which is fixed to the pivot pin 109. The pivot pin 109 is rotatably supported in the supports 14 and 15 so that the selector 108 is biased by the spring 112 to the position of FIG. 1A. A stop 115, which is fixed to the support 14, is engaged by a portion of the block 114 to ensure that the selector 108 is in the desired position whereby the cut strips or segments will fall into the passage 106 of the selector chute 105.

If the cut portion or segment of the strip 45 of material exceeds the predetermined thickness, then a solenoid 116, which is supported on the support 14 of the frame 10, is activated. As a result, a link 117, which connects the plunger of a solenoid 116 to the block 114 on the opposite side of the axis of the pivot pin 109 from the spring 112, is moved downwardly to cause the selector 108 to pivot counterclockwise (as viewed in FIG. 1A) to divert the cut segment of the strip 45 of material into the passage 107 of the selector chute 105.

The thickness of the strip 45 of material is measured when it passes between the meter plate 72 and the meter finger 73. As previously mentioned, when the strip 45 of material passes between the meter plate 72 and the meter finger 73, the meter arm 80 pivots clockwise about the axis of the pivot pin 81. When the thickness of the strip 45 of material exceeds the predetermined thickness, an adjustment screw 118 on the upper end of the meter arm 80 is moved away from the position in which it engages a resiliently biased arm 119 of a microswitch 120. When the resiliently biased arm 119 is allowed to move sufficiently because of the movement of the adjustment screw 118 due to the thickened portion of the strip 45 of material passing between the meter plate 72 and the meter finger 73, the microswitch 120 closes.

The closing of the switch 120 produces a signal, which is stored by the electric circuit of the present invention until after the cutting portion of the cycle and then used to change the position of the selector 108, to indicate that the thickness of the measured portion of the strip 45 of material exceeds the predetermined thickness. This is because measuring of the thickness of the strip 45 of material by cooperation of the meter plate 72 and the meter finger 73 occurs during the feed portion of the prior cycle of operation to that in which cutting of the measured portion of the strip 45 of material occurs.

Figure 11:
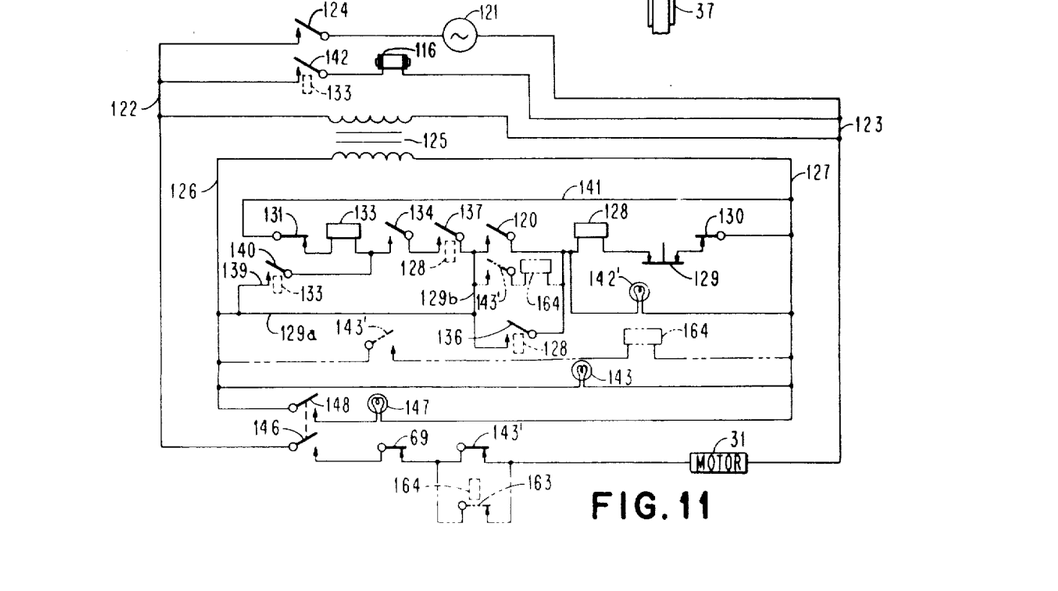
FIG. 11 is a schematic diagram of the electrical circuit used with the apparatus of the present invention.

Referring to FIG. 11, there is shown the electrical circuit of the present invention including AC power source 121, which is connected to supply lines 122 and 123 through a switch 124. When the switch 124 is closed, a transformer 125 supplies a stepped down AC voltage to lines 126 and 127.

Accordingly, when the switch 124 is closed, AC voltage is available between the lines 126 and 127. Thus, when the switch 120 is closed due to the measured portion of the strip 45 of material being thicker than the predetermined thickness, a relay 128 is picked if a push button 129, which is normally closed, is closed. Normally closed breaker contacts 130, which are supported by the support 14 and closed during the feed portion of the cycle when measurement of the thickness of the strip 45 of material is occurring, also are closed. Accordingly, a circuit is completed from the line 126 through a line 129a, a line 129b, the closed switch 120, the relay 128, the closed push button 129, and the closed breaker contacts 130 to the line 127.

After completion of the feed and cutting portions of the cycle, normally closed breaker contacts 131, which are supported by the support 14, are opened by a cam 132 (see FIG. 3), which is fixed to the shaft 30 for rotation therewith. Thus, the cam 132 has its profile designed to open the normally closed breaker contacts 131 just after completion of the cutting portion of the cycle. The opening of the breaker contacts 131 inactivates a relay 133, which is the relay that stores the signal from the closing of the switch 120 if the measured thickness of the strip 45 of material exceeded the predetermined thickness, if the relay 133 was energized during the prior cycle of operation. The opening of the breaker contacts 131 is for a very short period of time but this removes any stored signal from the previous cycle of operation.

Shortly after the breaker contacts 131 are opened by the cam 132, the breaker contacts 131 again close due to the profile of the cam 132. Just after the breaker contacts 131 close, normally open breaker contacts 134, which are supported by the support 14, are closed by a cam 135 (see FIGS. 3 and 4), which also is fixed to the shaft 30 for rotation therewith. If the relay 128 was energized during the feed portion of the cycle when the thickness of the strip 45 of material was measured, then the relay 133 is energized when the breaker contacts 131 and 134 close.

When the relay 128 is picked by closing of the switch 120, a normally open contact 136 of the control relay 128 is closed. Since the normally open contact 136 is in parallel with the switch 120, the closing of the normally open contact 136 provides a hold circuit for the relay 128 to maintain the relay 128 energized as long as the push button 129 and the breaker contacts 130 remain closed. Therefore, only a very slight length of the portion of the strip 45 of material being fed need be greater than the predetermined thickness for the relay 128 to be activated and remain in that condition.

With the relay 128 energized and the breaker contacts 131 and 134 closed, the relay 133 is activated because normally open contact 137 of the relay 128 also is closed when the relay 128 is picked. Accordingly, the signal, which closing of the switch 120 produced to indicate that the thickness of the strip 45 of material exceeded the predetermined thickness, is transferred from the relay 128 and is now stored by the relay 133 being energized.

The energization of the relay 133 provides a hold circuit for the relay 133 from the line 126 through the line 129a, a line 139, normally open contact 140 of the relay 133, the relay 133, the normally closed breaker contacts 131, and a line 141 to the line 127. As the pulley shaft 30 continues to rotate, the normally open breaker contacts 134 are opened by the cam 135 so that the hold circuit through the normally open contact 140 of the relay 133 must be employed to keep the relay 133 energized. Shortly after the breaker contacts 134 are opened, the normally closed breaker contacts 130 are opened by the cam 132, which also cooperates with the breaker contacts 131 as previously mentioned. The opening of the breaker contacts 130 causes the relay 128 to be de-energized. The breaker contacts 130 close shortly after opening because of the profile of the cam 132. Thus, this enables the relay 128 to again be ready for activation if the switch 120 is closed because the thickness of the strip 45 of material exceeds the predetermined thickness during the feed portion of the next cycle since all of these activations by the cams 132 and 135 occur after completion of the cutting portion of the cycle of operation and before the feed portion of the next cycle of operation.

The relay 133 has a normally open contact 142, which connects one side of the solenoid 116 to the line 122. The other side of the solenoid 116 is connected to the line 123. When the relay 133 is picked, the normally open contact 142 closes whereby the solenoid 116 is energized to pivot the selector 108 to the position in which it blocks the cut portion or segment of the strip 45 of material from falling into the passage 106 of the selector chute 105 and diverts it into the passage 107 of the selector chute 105. The energization of the solenoid 116 occurs after the cutting portion of the cycle in which the thickness of the strip 45 of material has been measured and before the feed portion of the next cycle during which the measured portion of the strip 45 of material will be cut.

Thus, the solenoid 116 is energized to change the position of the selector 108 after the cutting portion of the cycle and before the feed portion of the next cycle. Of course, the measurement of the thickness of the strip 45 of material during the feed portion of the cycle was not that portion of the strip 45 of material that is cut after the feed portion of the cycle but is that portion which will be cut after the feed portion of the next cycle. Therefore, the selector 108 is properly positioned to be ready for the next cut segment of the strip 45 of material.

A lamp 142' is disposed in parallel with the relay 128 and is energized whenever the relay 128 is picked.

Thus, the lamp 142' indicates whenever the thickness of the strip 45 of material has exceeded the predetermined thickness.

A lamp 143, which extends between the lines 126 and 127, is activated whenever the switch 124 is closed. Thus, the lamp 143 indicates whenever the power source 121 is connected to the supply lines 122 and 123.

In addition to the motor 31 being inactivated whenever the roller 65 is pulled up sufficiently by the strip 45 of material to open the switch 69, the motor 31 also is inactivated whenever a microswitch 143', which is supported on the meter base block 74, is opened. As shown in FIG. 1A, the microswitch 143' has a resiliently biased arm 144, which is engaged by an adjustment screw 145 supported on the meter arm 80 between the adjustment screw 118 and the pivot pin 81.

The adjustment screw 145 moves the arm 144 of the switch 143' inwardly to inactivate the motor 31 by opening the switch 143' only when there is no material between the meter plate 72 and the meter finger 73 whereby the arm 80 pivots counterclockwise (as viewed in FIG. 1A). This ensures that there is automatic cut off of the motor 31 whenever the strip 45 of material ceases to be fed and the end of the strip 45 of material is not held with the sewing machine.

Furthermore, as shown in FIG. 11, a manual switch 146 also permits inactivation of the motor 31. A lamp 147 is connected between the lines 126 and 127 and is activated when the switch 146 is closed through having a switch 148 connected to the switch 146. Accordingly, the lamp 147 indicates when the motor switch 146 is closed even if one of the switches 69 and 143' has been opened.

Even if the motor 31 becomes inactivated due to the opening of any of the switches 69, 143', and 146, the relay 133 remains energized because it is connected to the lines 126 and 127 of the secondary winding of the transformer 125. Therefore, the signal stored by energization of the relay 133 remains even if the operator opens the switch 146 to turn off the motor 31 when the operator leaves the apparatus of the present invention for a period of time. Of course, if the switch 124 is opened, then the stored memory is lost.

Figure 9:
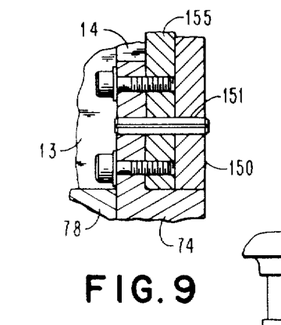
FIG. 9 is a sectional view showing the pivotal connection of the adjusting mechanism of FIG. 6.

The microswitch 120 is supported on a mounting base 150 (see FIGS. 1A, 4, 6, and 9), which is pivotally mounted at its lower end on the meter base block 74 by a pivot pin 151 (see FIGS. 4 and 9). Thus, the microswitch 120 may be moved toward and away from the adjustment screw 118 through pivoting the mounting base 150 about the pivot pin 151.

Pivoting of the mounting base 150 is produced by rotating an adjustment lever 152. The adjustment lever 152 has a cylindrical shaped portion 153 disposed within a slot 154 (see FIG. 1A) in the upper end of the mounting base 150 with the cylindrical shaped portion 153 eccentrically mounted by an integral threaded portion 154' (see FIG. 6) on a bar 155, which is secured to the meter base plate 74. Thus, when the adjustment lever 152 is rotated clockwise (as viewed in FIG. 1A), the microswitch 120 is moved toward the adjustment screw 118 while counterclockwise (as viewed in FIG. 1A) rotation of the adjustment lever 152 moves the microswitch 120 away from the adjustment screw 118.

When it is desired to move the roller 46 away from the knurled roller 17 to manually feed the strip 45 of material therebetween at the start, it also is necessary to move the meter finger 73 away from the meter plate 72. Movement of both of these occurs at the same time.

Movement of the roller 46 away from the knurled roller 17 is accomplished by pushing downwardly on a lever 156, which is pivotally mounted on a stud 157 fixed to the support 14. The lever 156 extends beneath the stud 47 and has a cut out portion 158 to accommodate the stud 47. When the lever 156 is moved downwardly, the lever 156 rotates counterclockwise about the stud 157 and has the upper surface of the cut out portion 158 engage the stud 47 to cause movement of the lever 50 (see FIGS. 3 and 4) against the force of the springs 53 and 54 whereby the roller 46 (see FIG. 1A) is moved away from the knurled roller 17. The movement of the roller 46 is both outwardly and upwardly away from the knurled roller 17.

This movement of the roller 46 causes it to engage a downwardly extending finger 158' on the meter arm 80 to pivot the meter arm 80 clockwise about the axis of the pivot pin 81. This withdraws the meter finger 73 from the meter plate 72 at the same time that the roller 46 is moved away from the knurled roller 17. Accordingly, the strip 45 of material may be manually fed by the operator between the pins 83 (see FIG. 7) on the meter plate 72 and through the opening 87 (see FIG. 5) in the guide 88.

As previously mentioned, the meter base block 74 is adjustable so that the top surface 84 of the meter plate 72 functions as a marker for cooperation with the indicia on the scale 85 (see FIG. 1A) to indicate the length of the strip 45 of material that is to be fed during each cycle. However, the control of the amount of feed of the strip 45 of material during each revolution of the pulley 29 is determined by the position of the head of the step screw 26 (see FIGS. 2 and 3) in the groove 26b in the block 27.

Accordingly, a scale 159 (see FIG. 8) is provided on a surface of the block 27 to indicate the length of the strip 45 of material that is fed during each revolution of the pulley 29. The bearing 25 has a pointer or marker 159' thereon for cooperation with the indicia on the scale 159 so that the operator can select the exact length of the strip 45 of material that is fed during each revolution of the pulley 29. The selected length on each of the scales 159 and 85 must be the same for there to be the correct measurement of the thickness of the strip 45 of material at the desired time.

The position of the switch 120 relative to the meter arm 80 must be adjusted for the particular thickness of the strip 45 of material being cut. Accordingly, it is necessary to make certain adjustments when the strip 45 of material is changed so as to have a different thickness.

To make these adjustments, the switch 124 (see FIGS. 1B and 11) is closed and the motor switch 146 is opened. Then, the lever 156 (see FIG. 1A) is moved downwardly so that the strip 45 of material may be fed between the meter plate 72 and the meter finger 73. The operator must make certain that the portion of the strip 45 of material in the meter plate 72 is not the thickened portion produced by the overlap of two portions sewed together.

After releasing the lever 156 to allow the meter finger 73 to return into engagement with the strip 45 of material, the adjustment lever 152 is rotated counterclockwise (as viewed in FIG. 1A) as far as it can go. This results in the switch 120 (see FIGS. 1A and 11) closing whereby the relay 128 (see FIG. 11) is activated and the lamp 142' (see FIGS. 1B and 11) is energized. Then, the push button 129 is moved to an open position to inactivate the relay 128. However, because the switch 120 is still closed, the lamp 142' remains energized by a circuit from the line 126 through the lines 129a and 129b, the switch 120, and the lamp 142' to the line 127.

The adjustment lever 152 is then rotated clockwise until the lamp 142' is de-energized. This occurs when the switch 120 is opened because of the arm 119 being engaged by the adjustment screw 118 and moved toward the switch 120. This insures that there is no activation of the switch 120 when the strip 45 of material has the desired thickness.

To provide a margin of safety for slight imperfections in the thickness of the strip 45 of material but not of the magnitude of the thickness produced by the overlapping sewed portions, the adjustment lever 152 is rotated clockwise a slight additional amount. This slight additional rotation is determined by graduation marks 160 (see FIG. 1A) on the front surface of the upper end of the mounting base 150 cooperating with a vertical side edge 161 of the support 14. For relatively thin materials, the adjustment lever 152 is rotated clockwise only a distance equal to two of the graduation mark, after the lamp 142' has been de-energized. For relatively thick materials, the adjustment lever 152 is rotated clockwise a distance equal to two of the graduations, which is the distance from a first graduation mark to a third graduation mark, after the lamp 142' has been de-energized.

If the lamp 142' should fail to become energized when the adjustment lever 152 is rotated counterclockwise as far as it can go or fail to become de-energized after being energized during rotation of the adjustment lever 152 clockwise, it is necessary to make a further adjustment. With the strip 45 of material between the meter plate 72 and the meter finger 73 and the adjustment lever 152 in a vertical position, the adjustment screw 118 is turned all the way back away from the arm 119 after releasing a clamping screw 162, which holds the adjustment screw 118 at the desired position. This results in the switch 120 closing whereby the relay 128 and the lamp 142' are energized. The push button 129 is then activated to open the circuit to the relay 128 but the lamp 142' still remains energized through the closed switch 120. Then, the adjustment screw 118 is advanced toward the arm 119 by rotating the adjustment screw 118 until the lamp 142' is de-energized because of the switch 120 being opened by movement of the arm 119 toward the switch 120. The push button 129 is then released, and the adjustment screw 118 retained in this position through tightening the clamping screw 162.

Considering the operation of the apparatus of the present invention after the various adjustments have been made, the strip 45 of material is passed over the roller 62 downwardly around the roller 65, upwardly over the roller 70, downwardly between the pins 83 on the meter plate 72 with the meter finger 73 held away from the meter plate 72 by downward depression of the lever 156, and then between the roller 17 and the roller 46 into the opening 87 (see FIG. 5) in the guide 88. The lever 156 is released, and the drag arm 63 is disposed on top of the portion of the strip 45 of material passing over the roller 62.

To begin operation, the operator must close the switch 124 (see FIGS. 1B and 11) and the motor switch 146. The motor 31 (see FIG. 2) rotates the pulley 29 to drive the feed roller 17 through the rack 24 engaging the gear 23 on the gear housing 20. During the first 180° of a revolution of the pulley 29, the rack 24 moves downwardly, and the roller 17 is rotated counterclockwise (as viewed in FIG. 1A) by the rack 24 through the gear 23 and the one direction clutches 22.

The connection between the pulley 29 and the rack 24 produces an acceleration of the rack 24 during its initial downward movement and a deceleration as the rack 24 completes its downward movement. Thus, the speed of rotation of the roller 17 is decreased as the feed of the strip 45 of material nears completion so that each segment fed by the roller 17 for cutting by cooperation between the cutting blades 92 and 93 is of the same length.

After completion of 180° of a revolution of the pulley 29, the rack 24 begins to move upwardly. In the next 90° of the revolution of the pulley 29 during which upward movement of the rack 24 occurs, the movable cutting blade 93 is moved into engagement with the stationary cutting blade 92 to cut the strip 45 of material which has been fed from a position just beneath the meter plate 72 past the cutting blades 92 and 93 during the first 180° of the revolution of the pulley 29. There is no feeding of the strip 45 of material during cutting because the rack 24 is moving upwardly.

During the final 90° of the revolution of the pulley 29 for a particular cycle of operation (this comprises a revolution of the pulley 29), the cams 132 and 135 become effective. Thus, if any of the portion of the strip 45 of material passing between the meter plate 72 and the meter finger 73 during the feed portion of the cycle was thicker than the predetermined thickness, then the relay 128 would have been energized during the feed portion of the cycle.

The cams 132 and 135 cooperate with the breaker contacts 130, 131, and 134 to transfer the signal from the relay 128 to the relay 133. This transfer of the signal to the relay 133 causes the solenoid 116 to be energized because the normally open contact 142 of the relay 133 is now closed. Thus, the selector 108 is pivoted counterclockwise (as viewed in FIG. 1A) about the axis of the pin 109 during the final portion of the final 90° of the revolution of the pulley 29 so as to be properly positioned during the cutting portion of the next complete revolution of the pulley 29.

The apparatus of the present invention functions automatically to continue to feed, cut, and determine the position of the selector 108 for the next cycle as long as the strip 45 of material is fed. If the strip 45 of material should be held in the sewing machine at which the segments, which form the strip 45 of material, are sewed to each other, then the roller 65 would move upwardly along the guide bar 67 until the switch 69 is opened. When this occurs, the motor 31 is inactivated so that rotation of the pulley 29 is stopped. This prevents any further operation until the roller 65 returns to the position in which the switch 69 is closed.

When the strip 45 of material ceases to be supplied to the apparatus of the present invention and the end of the strip 45 of material is not held at the sewing machine, the feeding of the end of the strip 45 of material past the meter finger 73 results in the meter finger 73 moving into engagement with the meter plate 72 whereby the switch 143' is opened by the adjustment screw 145. This also inactivates the motor 31 to stop operation of the apparatus of the present invention.

The remaining portion of the strip 45 of material between the measuring point, which is between the meter plate 72 and the meter finger 73, and the rollers 17 and 46 will fall by gravity whenever the roller 46 is moved away from the roller 17 or the roller 17 is rotated. Thus, there is no hang up of the strip 45 of material in the apparatus of the present invention.

The apparatus of the present invention continues to automatically cycle through 360° of rotation of the pulley 29 until either of the switches 143' or 69 is opened or the motor switch 146 is manually opened by the operator. Whenever the switch 124 is opened, this also stops all operation of the apparatus of the present invention as well as removing any signal stored in the relay 133 whereby the selector 108 would be returned by the spring 112 to the position of FIG. 1A.

If the strip 45 of material is formed by connecting the adjacent ends of two strips of the lays or pieces of material to each other by spacing them from each other and utilizing threads to connect the adjacent spaced ends to each other, then the thin portion of the strip 45 of material would be the unsatisfactory portion. To enable the apparatus of the present invention to be utilized with this type of strip of material, it is only necessary to change the wiring in the microswitch 120 so that it closes when the arm 119 is moved toward the switch 120 by the adjustment screw 118 rather than when the arm 119 is allowed to move away from the switch 120. This would allow the switch 120 to close when the thickness of the strip 45 of material decreased below a predetermined thickness so as to indicate that the portion of the strip 45 of material passing between the meter plate 72 and the meter finger 73 was only the threads which connect the adjacent spaced ends of two strips of the lays or pieces of material forming the strip 45 of material.

Because of the thinness of the strip 45 of material, the motor 31 would be inactivated through the switch 143' opening if the switch 143' were utilized in the same manner as previously described for the strip 45 of material when the strip 45 of material is formed by sewing overlapped portions of the strips from the lays or pieces of material to each other. Therefore, either the switch 143' must not be employed or the switch 143' must have its wiring changed so that it closes when the arm 144 is moved toward the switch 143' by the adjustment screw 145 and the switch 143' must be replaced in the circuit with the motor 31 by a normally closed contact 163 of a time relay 164 as shown in phantom in FIG. 11. The time relay 164 would be connected in series with the switch 143' between the lines 126 and 127 as shown in phantom in FIG. 11. The time relay 164 is not activated to open the normally closed contact 163 and deienergize the motor 31 for a predetermined period of time sufficient to allow the portion of the strip 45 of material having threads to pass between the meter plate 72 and the meter finger 73.

It is necessary for the rollers 17 and 46 to feed the strip 45 of material when the strip 45 of material is very thin due to only the threads, which connect the adjacent spaced ends of two strips to each other, being disposed between the rollers 17 and 46. Accordingly, the rollers 17 and 46 must be capable of engaging each other through slightly changing the position of the stop 57. Therefore, the rollers 17 and 46 are coated with a thin coating of a suitable protective material such as rubber, for example, to protect them when they engage.

The operation of the apparatus of the present invention when the strip 45 of material comprises strips from lays having their ends spaced from each other and connected by threads is the same as when the strip 45 of material comprises strips from lays having their ends overlapping and sewed to each other.

While the present invention has been shown and described as having the selector 108 activated in one arrangement to divert the cut segment to the passage 107 if the thickness of the cut segment exceeds a predetermined thickness and in another arrangement to divert the cut segment to the passage 107 if the cut segment is thinner than a predetermined thickness, it should be understood that the apparatus of the present invention is capable of having the selector 108 positioned to divert the cut segment to the passage 107 if the thickness of the measured portion of the strip 45 of material is either thicker or thinner than a predetermined thickness range. This would be utilized when the strip 45 of material is formed by having the overlapped portions sewed to each other. When this sewing is done, the possibility exists that the overlapped portions may not be sewed to each other in an overlapping relation but may be slightly spaced from each other accidentally. Additionally, the threads may become loose so that the strip 45 of material is not of the desired thickness in a particular non-overlapped portion since the strip 45 of material normally has the strips of the lays or pieces of material formed by sewing two portions of each of the lays or pieces to each other so that the thickness of the strip, when used for a belt loop, is at least double the thickness of a single lay or piece of material.

This would require certain modifications in the electrical circuit. While the microswitch 120 would still be closed when the arm 119 moves away from the switch 120 because of the position of the adjustment screw 118 owing to the thickness of the strip 45 of material exceeding the maximum thickness of the predetermined thickness range, the switch 143' would be placed in parallel, as shown in phantom in FIG. 11, with the switch 120 with the switch 143' being wired so that it closes when the arm 144 is moved inwardly by the adjustment screw 145 when the thickness of the strip 45 of material is less than the minimum thickness of the predetermined thickness range.

Since this minimum thickness of the predetermined thickness range would be greater than the absence of the material, it is necessary to insure that the motor 31 would be de-energized only due to the absence of the strip 45 of material between the meter plate 72 and the meter finger 73. Thus, the switch 143', which is in parallel with the switch 120, would have the time relay 164 in series therewith as shown in phantom in FIG. 11. When the switch 143' is closed, the time relay 164 would be activated. After a predetermined period of time, the time relay 164 would cause the opening of the normally closed contact 163, which has replaced the switch 143' in the circuit with the motor 31, so that the motor 31 would be inactivated. Thus, this would result in the motor 31 being de-energized only when the strip 45 of material has ceased to pass between the meter plate 72 and the meter finger 73.

Of course, in this arrangement, it would be necessary for the rollers 17 and 46 to be capable of engaging each other. This could be accomplished in the same manner as previously described when the apparatus is used with the strip 45 of material being formed by adjacent spaced ends of the strips from lays or pieces of material being sewed to each other by threads.

An advantage of this invention is that there is automatic selection between the satisfactory cut segments and the unsatisfactory cut segments. Another advantage of this invention is that there is no hang up of material. A further advantage of this invention is that there is automatic stopping of the feed of the strip of material when the supply of the strip of material ceases.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

We claim:

1. An apparatus for cutting a strip of material into segments of a selected length including:

means to feed the strip of material in a vertical direction past a cutting position;

means to cut the fed material at the cutting position, said cutting means being disposed beneath said feed means;

means controlling said feed means and said cutting means to stop feed of the strip of material by said feed means before said cutting means cuts the strip of material;

means to measure the thickness of the strip of material, said measuring means being disposed above said feed means to measure the thickness of the strip of material during the feed portion of the cycle preceding the cutting of the measured portion of the strip of material by said cutting means;

selector means disposed beneath said cutting means to direct the cut segment into a first area when its thickness is not within a predetermined thickness range and a second area when its thickness is within the predetermined thickness range;

and means responsive to said measuring means determining that the strip of material is not within the predetermined thickness range to cause said selector means to direct the cut segment during the cutting portion of the next cycle to the first area.

2. The apparatus according to claim 1 in which said measuring means includes:

a first element cooperating with one side of the strip of material;

a second element cooperating with the other side of the strip of material;

means to pivotally mount said second element for movement relative to said first element;

means acting on said pivotal mounting means to urge said second element toward said first element;

and means responsive to said second element being moved relative to said first element by the thickness of the strip of material not being within the predetermined thickness range to transmit a signal to said first mentioned responsive means to cause said selector means to direct the cut segment during the cutting portion of the next cycle to the first area.

3. The apparatus according to claim 2 including:

support means;

means slidably supported on said support means for vertical movement;

said pivotal mounting means including: an arm having said second element fixed thereto; and means to pivotally mount said arm on said slidably supported means;

said slidably supported means having said first element fixed thereto;

and means to releasably retain said slidably supported means on said support means whereby the vertical distance from where said first element and said second element measure the thickness of the strip of material to said feed means is adjustable.

4. The apparatus according to claim 3 in which:

said second element responsive means includes switch means;

means to support said switch means on said slidably supported means for vertical movement therewith;

and means to move said switch means relative to said arm to control the thickness of the strip of material at which said switch means transmits a signal to cause said selector means to have its position changed.

5. The apparatus according to claim 4 including:

means on said arm for cooperation with said switch means to cause said switch means to transmit a signal when the strip of material is not within the predetermined thickness range whereby said selector means has its position changed;

and said moving means for said switch means including means to move said support means for said switch means relative to said slidably supported means to change the position of said switch means relative to said cooperating means on said arm.

6. The apparatus according to claim 3 including means supported on said slidably supported means to stop said feed means and said cutting means when the strip of material ceases to pass between said first element and said second element.

7. The apparatus according to claim 2 in which:

said feed means includes two cooperating rollers between which the strip of material is fed;

means to rotate one of said rollers in only one direction to feed the strip of material between said rollers;

and means to move said roller that is not rotated away from said rotated roller and said second element away from said first element to permit the strip of material to be fed therebetween.

8. The apparatus according to claim 1 including:

a single drive means;

first means to cause said single drive means to activate said feed means;

and second means to cause said single drive means to activate said cutting means.

9. The apparatus according to claim 8 in which:

said cutting means includes:

a stationary cutting blade;

and a movable cutting blade;

and said second means causes said single drive means to activate said movable cutting blade to move said movable cutting blade horizontally relative to said stationary cutting blade.

10. The apparatus according to claim 1 in which:

said cutting means includes:

a stationary cutting blade;

and a movable cutting blade;

and said controlling means includes means to move said movable cutting means horizontally relative to said stationary cutting blade.

11. The apparatus according to claim 1 in which said controlling means includes means to control said responsive means so that said selector means is activated after said cutting means is inactivated and before said cutting means is again activated.

* * * * *